United States Patent
Dayal et al.

(10) Patent No.: US 9,692,556 B1
(45) Date of Patent: Jun. 27, 2017

(54) COMMUNICATION SYSTEM WITH I/Q IMBALANCE ADJUSTMENT MECHANISM AND METHOD OF OPERATION THEREOF

(71) Applicant: Samsung Electronics Co., Ltd., Suwon-si, Gyeonggi-Do (KR)

(72) Inventors: Pranav Dayal, San Diego, CA (US); Jungwon Lee, San Diego, CA (US); Gennady Feygin, San Diego, CA (US); Jaeyoung Kim, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/052,758

(22) Filed: Feb. 24, 2016

Related U.S. Application Data

(60) Provisional application No. 62/262,319, filed on Dec. 2, 2015.

(51) Int. Cl.
  *H04L 27/00* (2006.01)
  *H04L 1/00* (2006.01)
  *H04B 1/30* (2006.01)
  *H04L 25/03* (2006.01)

(52) U.S. Cl.
  CPC ............ *H04L 1/0054* (2013.01); *H04B 1/30* (2013.01); *H04L 2025/03636* (2013.01)

(58) Field of Classification Search
  CPC ........ H04L 1/0054; H04L 2025/03636; H04B 1/30
  See application file for complete search history.

(56) References Cited

U.S. PATENT DOCUMENTS

| | | | |
|---|---|---|---|
| 7,123,896 B2 * | 10/2006 | Chiu ..................... | H04B 1/123 375/316 |
| 8,340,225 B2 | 12/2012 | Khoshgard et al. | |
| 8,792,590 B2 | 7/2014 | Furman | |
| 9,042,487 B2 | 5/2015 | Raghu et al. | |
| 2006/0182189 A1* | 8/2006 | Yu ......................... | H04L 25/061 375/260 |
| 2011/0064166 A1* | 3/2011 | Khoshgard ......... | H04L 27/3863 375/324 |
| 2014/0140379 A1* | 5/2014 | Teplitsky ............. | H04L 27/364 375/219 |
| 2015/0271005 A1* | 9/2015 | Wang .................. | H04L 27/3405 375/254 |

\* cited by examiner

*Primary Examiner* — Dac Ha
(74) *Attorney, Agent, or Firm* — IP Investment Law Group

(57) ABSTRACT

A communication system includes: an inter-device interface configured to receive received signal including communication content; a communication circuit, coupled to the inter-device interface, configured to: determine an in-phase signal-component and a quadrature signal-component based on the received signal, calculate an adjustment value including a first adjustment and a second adjustment based on the in-phase signal-component and the quadrature signal-component according to a maximum-likelihood mechanism, and adjust the received signal based on the adjustment value for reducing an in-phase/quadrature imbalance between the in-phase signal-component and the quadrature signal-component in processing the communication content.

18 Claims, 5 Drawing Sheets

COMMUNICATION SYSTEM WITH I/Q IMBALANCE ADJUSTMENT MECHANISM AND METHOD OF OPERATION THEREOF

CROSS-REFERENCE TO RELATED APPLICATION(S)

This application claims the benefit of U.S. Provisional Patent Application Ser. No. 62/262,319 filed Dec. 2, 2015, and the subject matter thereof is incorporated herein by reference thereto.

TECHNICAL FIELD

An embodiment described herein relates generally to a communication system and more particularly to a system with I/Q imbalance adjustment mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of errors, as well as computational complexities rising from numerous possible formats for communicated information, which affect the quality and speed of the accessible data.

Thus, a need still remains for a communication system with I/Q imbalance adjustment mechanism. In view of the ever-increasing commercial competitive pressures, along with growing consumer expectations and the diminishing opportunities for meaningful product differentiation in the marketplace, addressing such issues are becoming increasingly valuable. Additionally, the need to reduce costs, improve efficiencies and performance, and meet competitive pressures adds an even greater urgency for finding answers to these problems.

Solutions to these problems have been long sought but prior developments have not taught or suggested any solutions and, thus, solutions to these problems have long eluded those skilled in the art.

SUMMARY

An embodiment described herein provides a communication system, including: an inter-device interface configured to receive a signal including communication content; a communication circuit, coupled to the inter-device interface, configured to: determine an in-phase signal-component and a quadrature signal-component based on the received signal, calculate an adjustment value including a first adjustment and a second adjustment based on the in-phase signal-component and the quadrature signal-component according to a maximum-likelihood mechanism, and adjust the received signal based on the adjustment value for reducing an in-phase/quadrature imbalance between the in-phase signal-component and the quadrature signal-component in processing the communication content.

An embodiment described herein provides a method of operation of a communication system including: receiving a signal including communication content; determining an in-phase signal-component and a quadrature signal-component based on the received signal; calculating with a circuit an adjustment value including a first adjustment and a second adjustment based on the in-phase signal-component and the quadrature signal-component according to a maximum-likelihood mechanism; and adjusting the received signal based on the adjustment value for reducing an in-phase/quadrature imbalance between the in-phase signal-component and the quadrature signal-component in processing the communication content.

An embodiment described herein provides a non-transitory computer readable medium including instructions for operating a communication system including: receiving a received signal including communication content; determining an in-phase signal-component and a quadrature signal-component based on the received signal; calculating an adjustment value including a first adjustment and a second adjustment based on the in-phase signal-component and the quadrature signal-component according to a maximum-likelihood mechanism; and adjusting the received signal based on the adjustment value for reducing an in-phase/quadrature imbalance between the in-phase signal-component and the quadrature signal-component in processing the communication content.

Certain embodiments have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
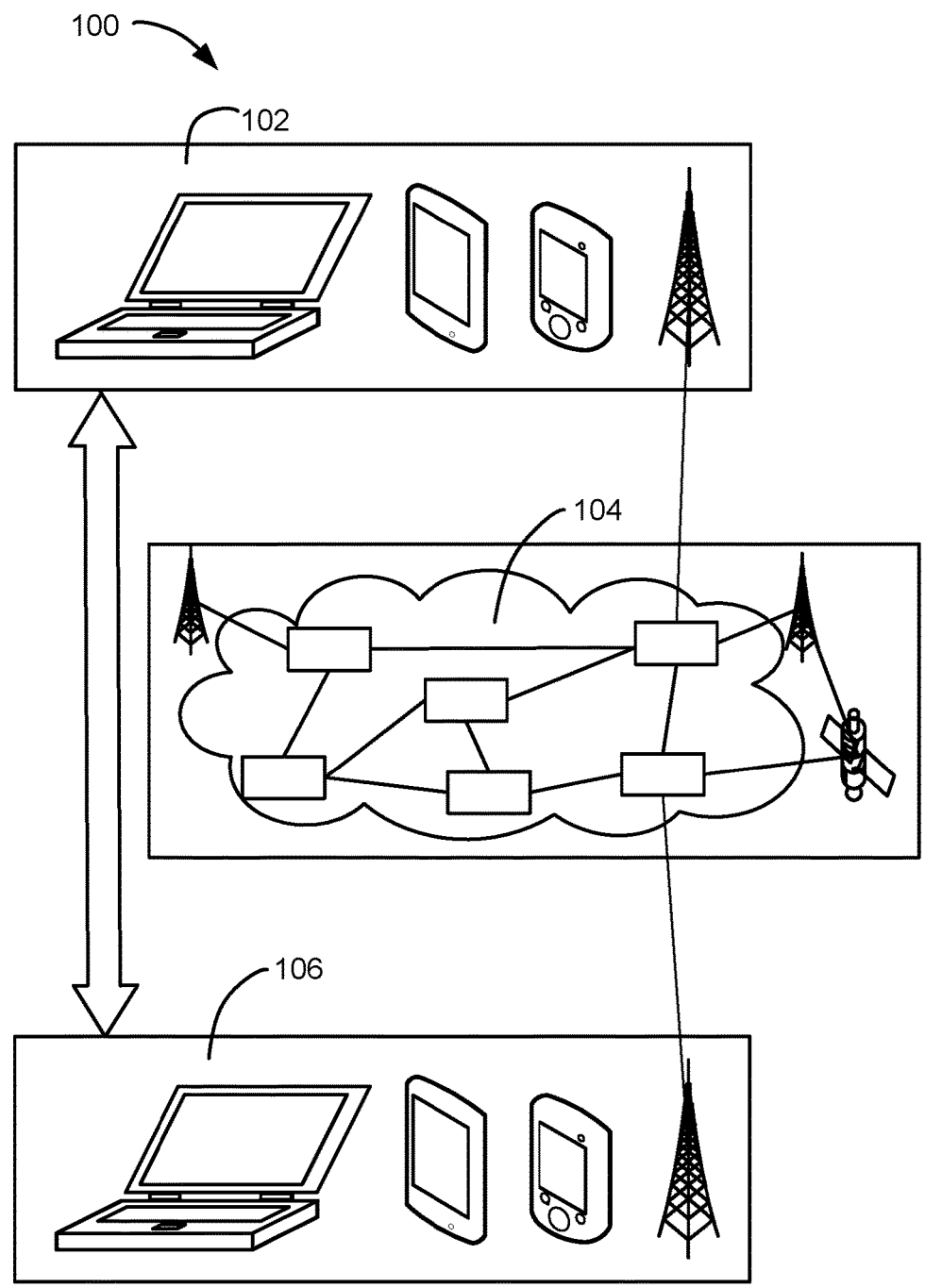
FIG. 1 is a communication system with I/Q imbalance mechanism in an embodiment.

The following embodiments can remove or reduce an I/Q imbalance between an in-phase signal-component and a quadrature signal-component of a received signal resulting from processing of a down-conversion mechanism. The I/Q imbalance can be removed or reduced based on calculating an adjustment value according to a maximum-likelihood mechanism instead of or in addition to a least-mean-squares mechanism, or a portion thereof.

The adjustment value can be calculated using a combination of an in-phase squared result and a quadrature squared result for the maximum-likelihood mechanism instead of a combination of an in-phase absolute-value result and a quadrature absolute-value result for the least-mean-squares mechanism. The adjustment value is therefore calculated using a maximum-likelihood value unique for the maximum-likelihood mechanism and different from factors used for the least-mean-squares mechanism.

The following embodiments are described in sufficient detail to enable those skilled in the art to make and use the invention. It is to be understood that other embodiments would be evident based on the present disclosure, and that system, process, architectural, or mechanical changes can be made without departing from the scope of an embodiment of the present invention.

In the following description, numerous specific details are given to provide a thorough understanding of the invention. However, it will be apparent that the invention and various embodiments may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "block" referred to herein can include or be implemented as software, hardware, or a combination thereof in an embodiment of the present invention in accordance with the context in which the term is used. For example, the software includes machine code, firmware, embedded code, and application software. The software can also include a function, a call to a function, a code block, or a combination thereof. Also for example, the hardware may include gates, circuits, processor, computer, integrated circuit, integrated circuit cores, a microelectromechanical system (MEMS), passive devices, physical non-transitory memory medium having instructions for performing the software function, a portion therein, or a combination thereof. Further, if a block is written in the apparatus claims section below, the blocks are deemed to include hardware circuitry for the purposes and the scope of apparatus claims.

The blocks in the following description of the embodiments can be coupled to one other as described or as shown. The coupling can be direct or indirect without or with, respectively, other items intervening between the coupled items. The coupling can be physical contact or by communication between items.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a communication system 100 with communication link mechanism in an embodiment of the present invention. The communication system 100 can include a first device 102. The first device 102 can include a device operating as one portion or party in communicating or exchanging information between devices.

The first device 102 can be a user electronic device, connected to a network 104. The first device 102 can include a portable or mobile device, a stationary device, a consumer device, a host device, or a combination thereof.

For example, the first device 102 may include a mobile phone, a smart phone, a wearable device, an implanted device, a laptop or tablet computer, a vehicle, a portion therein, or a combination thereof. Also for example, the first device 102 includes a router, a server, an object or an article including Internet of Things (IoT) capability or feature therein, a desktop computer, a portion therein, or a combination thereof.

Also for example, the first device 102 includes a circuit or a device within a comprehensive device, such as a portion or circuit specializing in processing information within a storage device or system. Also for example, the first device 102 includes user equipment (UE).

The network 104 is a system of wired or wireless communication devices or means that are connected to each other for enabling communication between devices. For example, the network 104 includes a combination of wires, transmitters, receivers, antennas, towers, stations, repeaters, telephone network, servers, or client devices for a wireless cellular network for exchanging or communicating data or information between devices. The network 104 can also include a combination of routers, cables, computers, servers, and client devices for various sized area networks, for a wireless cellular network, or a combination thereof for exchanging or communicating data or information between devices. Also for example, the network 104 includes a communication bus, a wire, a cable, a wireless connection, or a combination thereof between units or circuits within a device.

The first device 102 can communicate with or through the network 104. The first device 102 can further communicate with another device, such as another device similar in type or classification as the first device 102.

The communication system 100 can include a second device 106 for directly or indirectly linking and communicating with the first device 102. The network 104 can include the second device 106. The second device 106 can receive wireless or wired communication signals from the first device 102, transmit signals to the first device 102, process signals, or a combination thereof. The second device 106 can also relay signals between other instances of the second device 106, components within the network 104, or a combination thereof.

The first device 102 can communicate with the second device 106 including a portable or mobile device, a stationary device, a consumer device, a host device, or a combination thereof similar in type or category as the first device 102, either directly or through the network 104. The first device 102 can further communicate with the second device 106 including an access node, a server, or a combination thereof different in type or category from the first device 102, either directly or through the network 104.

The first device 102 can be connected to the network 104 through the second device 106. The second device 106 can send signals to, receiving signals from, or a combination thereof in communicating and connecting the first device 102.

For example, the second device 106 includes a router, a server, a gateway, a modem, a base station, a cell tower, a wireless router, an antenna, a portion therein, or a combination thereof. Also for example, the second device 106 includes a user device or a mobile device acting as a base station, an access point, a hub, a hotspot, a tethering point, a peer-to-peer network component, or a combination thereof. Also for example, the second device 106 includes an evolved node B (eNodeB) as an element in an air interface representing evolved UMTS terrestrial radio access (e-UTRA).

Also for example, the second device 106 includes a communication device or a processing component included or with a cell tower, a wireless router, an antenna, or a combination thereof being used to communicate with, such as by sending signals to or receiving signals from, the first device 102 including a mobile computing device. Also for example, the second device 106 includes a portion or circuit specializing in storing information within the storage device or system.

The second device 106 can be used to exchange signals representing content for communication, including voice or sounds of a telephone call or data representing a webpage, text, a picture, an instruction, an interaction therewith, a control parameter, or a combination thereof. The second device 106 can also transmit reference signals, training signals, error detection signals, error correction signals, header information, transmission format, protocol information, or a combination thereof for enabling the communication of the content.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

For illustrative purposes, the communication system 100 is shown with the first device 102 as a mobile end-user device and the second device 106 as a base station. However, it is understood that the first device 102 and the second device 106 can include separate and independent circuits that communicate and exchange data or information with each.

As exemplified and discussed above, the first device 102, the second device 106, or a combination thereof can include a variety of end-user devices, servicing devices, dedicated devices, circuits within a device, or a combination thereof. Also for example, the first device 102, the second device 106, or a combination thereof can include communication circuits utilizing various means of communication including various wired or wireless communication devices.

The communication system 100 can exchange or communicate communication content between devices, such as the first device 102, the second device 106, or a combination thereof. The communication content can include information intended for communication from one device to another device. The communication content can include information for processing, implementation, display, recreation, or a combination thereof at the receiving device.

The communication content can be sent from a sending device using transmitted signal. The communication system 100 can process the communication content to generate the transmitted signal. For example, the first device 102, the second device 106, or a combination thereof processes the communication content including coding-decoding the communication content, generating symbols corresponding to the communication content, or a combination thereof.

The transmitted signal after passing through a wireless or wired medium becomes a received signal at a receiver device. The received signal can include information detected or identified at the receiving device and corresponding to the transmitted signal.

The received signal can be different from the transmitted signal. The received signal can also include the transmitted signal altered or changed during transmission between devices. The received signal can include the transmitted signal altered or changed due to delay, attenuation, noise, reflection, refraction, degradation, phase shift, interfering signals from other transmitting sources, or a combination thereof.

The communication system 100 can use a down-conversion mechanism for initially processing the received signal. The down-conversion mechanism is a method, a process, a circuit, a portion therein, or a combination thereof for altering the modulation frequency of the received signal.

For example, the down-conversion mechanism can include a quadrature down-conversion circuit of zero intermediate frequency (IF) receiver or non-zero IF down-conversion circuit. The down-conversion mechanism can translate the received signal directly from a carrier frequency to baseband using a mixing stage, or through multiple conversion stages, including an up conversion stage a down conversion stage, or a combination thereof.

Also for example, the communication system 100 can use the down-conversion mechanism to determine or identify a combination of an in-phase signal-component and a quadrature signal-component for the received signal. The in-phase signal-component can be represented as 'I'. The quadrature signal-component can be represented as 'Q'.

The in-phase signal-component can include a portion of the received signal translated according to a phase. The quadrature signal-component can include a different portion of the received signal translated according to a different phase.

As a more specific example, the down-conversion mechanism includes a local oscillator generating a sinusoidal wave. The in-phase signal-component can be determined or generated by directly mixing the sinusoidal wave with the received signal. The quadrature signal-component can be determined or generated by mixing a delayed or phase-offset instance of the sinusoidal wave with the received signal.

The down-conversion mechanism may suffer from an in-phase/quadrature (I/Q) imbalance when attempting to determine or identify the combination of in-phase signal-component and the quadrature signal-component. The I/Q imbalance can include an unintended corruption or mismatch between the ideal values of the combination of the in-phase signal-component and the quadrature signal-component and the actual combination of their measured values.

The I/Q imbalance can be based on or result from a mismatch or an error in the local oscillator, a difference or an imbalance between processing implementation portions, such as for mixers or filters, for the in-phase signal-component and the quadrature signal-component, or a combination thereof. The I/Q imbalance can include unintended errors in the baseband signal resulting from the down-conversion mechanism.

The receiver of the communication system 100 can correct or reduce the I/Q imbalance. The receiver of the communication system 100 can compute an adjustment value for correcting or reducing the I/Q imbalance. The communication system 100 can adjust the in-phase signal-component, the quadrature signal-component, or a combination thereof by applying or processing with the adjustment value.

The adjustment value is a set of one or more values corresponding to the I/Q imbalance for reducing or eliminating the I/Q imbalance. The adjustment value can be evaluated using an equation, a process, a circuit, or a combination thereof for calculating or applying the set of one or more values.

The adjustment value can be processed based on a maximum-likelihood mechanism. The maximum-likelihood mechanism is a process, a method, a circuit, or a combination thereof for estimating parameters of a statistical model of given data. The maximum-likelihood mechanism can be based on maximizing a likelihood function. The maximum-likelihood mechanism can be used for calculating the adjustment value for correcting or adjusting for the I/Q imbalance.

The maximum-likelihood mechanism can represent implementation of one or more assumptions on statistical properties of the in-phase signal-component and the quadrature signal-component. For example, the maximum-likelihood mechanism is based on assuming the in-phase signal-component and the quadrature signal-component as being independent and identically distributed Gaussian variables with zero mean and an identical variance level. The maximum-likelihood mechanism can represent the process, the method, the circuit, or a combination thereof for reducing or eliminating the I/Q imbalance based on such assumption.

The adjustment value can include an update parameter. The update parameter is a set of one or more values used to adjust or correct for the I/Q imbalance. For example, the update parameter includes one or more constants or multiplicative factors for calculating one or more adjustment values.

The adjustment value can include one or more values corresponding to the maximum-likelihood mechanism instead of, in addition to, or a combination of relative to a least-mean-squares mechanism or a portion therein. The least-mean-squares mechanism is a process, a method, a circuit, or a combination thereof for finding parameters based on a least mean square of error signal between desired and actual signal.

The least-mean-squares mechanism can include or utilize a difference between an in-phase absolute-value result and a quadrature absolute-value result. The in-phase absolute-value result is an absolute value or magnitude of the in-phase signal-component. The quadrature absolute-value result is an absolute value or magnitude of the quadrature signal-component.

The communication system 100 can process the adjustment value, the in-phase signal-component, the quadrature signal-component, or a combination thereof according to processing iteration. The processing operation consists of iterative computation of corrected values of in-phase component and quadrature component based on a current instance of the adjustment value and one or more previously computed and processed instances of the adjustment value.

For notational convenience, iterations are numbered consequently, with current iteration represented as 'n+1' iteration and preceding iteration represented as 'n'. Similarly, the following iteration after the current iteration can be represented as 'n+2'. Details regarding the actual computation and processing of the adjustment value, the in-phase signal-component, the quadrature signal-component, or a combination thereof are discussed below.

Figure 2:
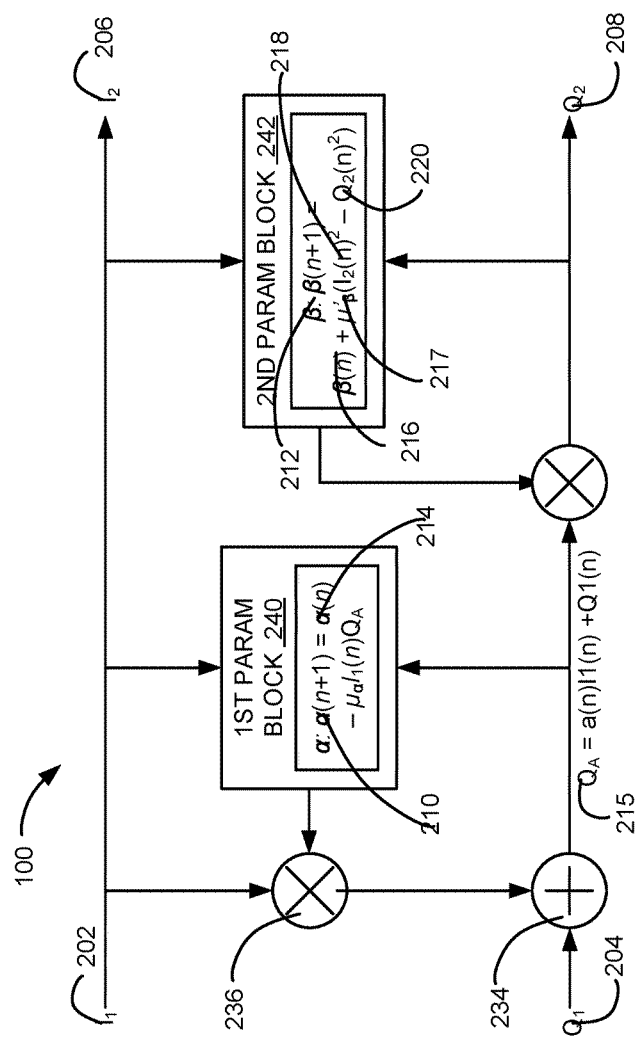
FIG. 2 is an exemplary illustration of the communication system.

Referring now to FIG. 2, therein is shown an exemplary illustration of the communication system 100. A device in the communication system 100, as illustrated with the first device 102 in FIG. 1, can receive a signal for the received signal.

The communication system 100 can use the down-conversion mechanism to generate, determine, or identify the in-phase signal-component including an uncorrected or an initial in-phase signal component 202, and the quadrature signal-component including an uncorrected or an initial quadrature signal component 204. The communication system 100 can include an in-phase signal-component path and a quadrature signal-component path as illustrated in FIG. 2.

The initial in-phase signal component 202 is an unadjusted output of the in-phase signal-component from the down-conversion mechanism. The initial quadrature portion 204 is an unadjusted output of the quadrature signal-component from the down-conversion mechanism. The initial combination of the initial in-phase signal component 202 and the initial quadrature signal component 204 can include the I/Q imbalance unintended by the communication system 100.

The communication system 100 can determine or identify the in-phase signal-component, the quadrature signal-component, or a combination thereof according to the processing iteration, such as the current iteration or the preceding iteration. The communication system 100 can generate, determine, or identify the initial in-phase signal component 202, the initial quadrature portion 204, or a combination thereof at a beginning portion of the processing iteration.

The communication system 100 can calculate, generate, and use the adjustment value to adjust the initial in-phase signal component 202, the initial quadrature portion 204, a partially adjusted instance thereof, or a combination thereof to remove or minimize the I/Q imbalance. The communication system 100 can calculate or generate the adjustment value using or based on the maximum-likelihood mechanism. The communication system 100 can apply or process the adjustment value to generate or produce an adjusted in-phase signal component 206, an adjusted quadrature signal component 208, or a combination thereof.

The adjusted in-phase signal component 206 is an adjusted or corrected instance of the in-phase signal-component. The adjusted quadrature signal component 208 is an adjusted or corrected instance of the quadrature signal-component. The adjusted in-phase signal component 206, the adjusted quadrature signal component 208, or a combination thereof can include the initial signal portions fully adjusted by the communication system 100 at an end of a process or an iteration thereof.

The adjusted in-phase signal component 206, the adjusted quadrature signal component 208, or a combination thereof can be without the I/Q imbalance or can include a reduced or minimized amount of the I/Q imbalance resulting from the application or the processing of the adjustment value. The adjusted combination of adjusted in-phase signal component 206 and the adjusted quadrature signal component 208 becomes available at the completion of the processing iteration for processing the in-phase signal-component and the quadrature signal-component.

The communication system 100 can exchange or communicate the communication content between devices, such as by transmitting and receiving signals, using one or more inter-device interfaces for the first device 102 and the second device 106 of FIG. 1. The communication system 100 can further communicate or process the signals, including implementation of the down conversion mechanism, processing of the adjustment value including calculation, generation, and application thereof to eliminate or reduce the I/Q imbalance, further processing for the communication content based on the processing results, or a combination thereof using one or more control circuits, one or more communication circuits, or a combination thereof for the first device 102 and the second device 106.

The communication system 100 can further store the communicated signals in one or more storage circuits for the first device 102 and the second device 106. The communication system 100 can further utilize one or more interfaces to access or communicate information between circuits within the first device 102 or the second device 106. Details of the inter-device interfaces, the communication circuits, the storage circuits, and the control circuits are discussed below.

The adjustment value can include one or more values or parameters for adjusting or correcting the in-phase signal-component, the quadrature signal-component, or a combination thereof. For example, the adjustment value includes a first adjustment, represented as 'α', a second adjustment, represented as 'β', or a combination thereof.

The first adjustment, the second adjustment, or a combination thereof can be dynamically calculated based on the in-phase signal-component, the quadrature signal-component, or a combination thereof. The first adjustment, the second adjustment, or a combination thereof can be applied to or combined with the in-phase signal-component, the quadrature signal-component, or a combination thereof.

The communication system 100 can include a first parameter block 240 configured to calculate the adjustment value including the first adjustment. The first parameter block 240 can calculate a current first adjustment 210, represented as 'α(n+1)', for the current iteration. The first parameter block 240 can calculate the current first adjustment 210 from or based on a preceding first adjustment 214, represented as α(n)' corresponding to the preceding iteration. The first parameter block 240 can calculate the adjustment value based on or according to the maximum-likelihood mechanism. The preceding first adjustment 214 can include the first adjustment calculated and utilized in the preceding iteration occurring or completing prior to the current iteration.

The first parameter block 240 can calculate the current first adjustment 210 based on the in-phase signal-component and the quadrature signal-component. For example, the first parameter block 240 calculates the current first adjustment 210 based on the preceding first adjustment 214, a first update parameter, represented as '$\mu_\alpha$', the initial in-phase signal component 202, the initial quadrature portion 204, a partially processed or adjusted instance thereof, or a combination thereof.

As a more specific example, the first parameter block 240 calculates the current first adjustment 210 based on:

$$\alpha(n+1)=\alpha(n)-\mu_\alpha I_1(n)(\alpha(n)I_1(n)+Q_1(n)).$$  Equation (1).

The current first adjustment 210 can be represented as '$\alpha(n+1)$'. The preceding first adjustment 214 can be represented as '$\alpha(n)$'. The initial in-phase signal component 202 of the preceding iteration can be represented as '$I_1(n)$'. The initial quadrature portion 204 can be represented as '$Q_1(n)$'. The term '$\mu_\alpha$' can represent the first update parameter functioning as an adjustment parameter for the first adjustment for updating the first adjustment to converge to the maximum-likelihood value.

For illustrative purposes, the current first adjustment 210 and the preceding first adjustment 214 are represented with the processing iterations 'n' and 'n+1'. However, it is understood that the communication system 100 can use the first adjustment corresponding to any processing iteration preceding the current iteration as discussed above for processing iterations.

The first parameter block 240 can calculate the first adjustment, such as the current first adjustment 210, using one or more communication circuits, one or more control circuits, or a combination thereof corresponding to the receiving device. The first parameter block 240 can store the first adjustment, with the current first adjustment 210 becoming the preceding first adjustment 214 after completing the current iteration, in one or more storage circuits, one or more communication circuits, or a combination thereof corresponding to the receiving device.

The communication system 100 can apply the current first adjustment 210 to the in-phase signal-component, the quadrature signal-component, or a combination thereof in removing or eliminating the I/Q imbalance. The communication system 100 can apply the current first adjustment 210 to the in-phase signal-component. The communication system 100 can apply the current first adjustment 210 by calculating a result of multiplying the current first adjustment 210 with the initial in-phase signal component 202. The communication system 100 can further multiply the values together using a multiplier 236.

The communication system 100 can further combine the product of the current first adjustment 210 and the initial in-phase signal component 202 with the initial quadrature signal component 204. The communication system 100 can combine the product and the initial quadrature signal component 204 by adding the values together using an adder 234.

The communication system 100 can calculate a partially-adjusted quadrature component 215. The partially-adjusted quadrature component 215 is an output resulting from combining the current first adjustment 210 with the in-phase signal-component and the quadrature signal-component. The partially-adjusted quadrature component 215 can include the signal or the value resulting after the adder 234 based on multiplying the current first adjustment 210 with the initial in-phase signal component 202, and then adding the resulting product and the initial quadrature signal component 204.

The partially-adjusted quadrature component 215 can be represented as '$Q_A$' and further be represented mathematically as '$\alpha(n)I_1(n)+Q_1(n)$'. The partially-adjusted quadrature component 215 can be fed back to the first parameter block 240. The first parameter block 240 can use the partially-adjusted quadrature component 215 along with the in-phase signal-component as exemplified in Equation (1) to calculate and update the first adjustment.

The communication system 100 can include a second parameter block 242 configured to calculate the adjustment value including the second adjustment. The second parameter block 242 can calculate a current second adjustment 212, represented as '$\beta(n+1)$', for the current iteration. The second parameter block 242 can calculate the current second adjustment 212 from or based on a preceding second adjustment 216, represented as '$\beta(n)$' corresponding to the preceding iteration.

The second parameter block 242 can calculate the adjustment value based on or according to the maximum-likelihood mechanism. The preceding second adjustment 216 can include the second adjustment calculated and utilized in the preceding iteration occurring or completing prior to the current iteration.

The second parameter block 242 can calculate the current second adjustment 212 based on the preceding first adjustment 214, the preceding second adjustment 216, or a combination thereof along with the in-phase signal-component and the quadrature signal-component. For example, the second parameter block 242 calculates the current second adjustment 212 based on the preceding second adjustment 216, the update parameter, the in-phase signal-component corresponding to the processing iteration, the quadrature signal-component corresponding to the processing iteration, or a combination thereof.

The second parameter block 242 can calculate the current second adjustment 212 according to the maximum-likelihood mechanism instead of, in addition to, or a combination of relative to the least-mean-squares mechanism or a portion therein. For example, the second parameter block 242 calculates the current second adjustment 212 based on directly multiplying the in-phase signal-component with itself, or based on calculating a squared result thereof, represented as '$I^2$'. Also for example, the second parameter block 242 calculates the current second adjustment 212 based on directly multiplying the quadrature signal-component with itself, or calculating a squared result thereof, represented as '$Q^2$'.

Also for example, the second parameter block 242 can calculate the current second adjustment 212 based on direct multiplication instead of utilizing the in-phase absolute-value result and the quadrature absolute-value result. As a more specific example, the second parameter block 242 calculates the current second adjustment 212 based on an in-phase squared result 218 and a quadrature squared result 220 without utilizing or instead of the in-phase absolute-value result and the quadrature absolute-value result.

The in-phase squared result 218 can include a mathematical squared value of the in-phase signal-component, including the initial in-phase signal component 202, the adjusted in-phase signal component 206, or a combination thereof. The quadrature squared result 220 can include a mathematical squared value of the quadrature signal-component, including the adjusted quadrature signal component 208.

The second parameter block 242 can calculate the in-phase squared result 218, represented as '$I_2^2$ or $I_2(n)^2$', based on multiplying the adjusted in-phase signal component 206 of the preceding iteration with itself, or based on calculating a squared result thereof. The second parameter block 242 can further calculate the quadrature squared result 220, represented as '$Q_2^2$ or $Q_2(n)^2$', based on multiplying the adjusted quadrature signal component 208 of the preceding iteration with itself, or based on calculating a squared result thereof.

The second parameter block 242 can calculate the current second adjustment 212 based on the in-phase squared result 218 and the quadrature squared result 220, along with the preceding second adjustment 216, the in-phase signal-component, the quadrature signal-component, or a combination thereof. As a more specific example, the second parameter block 242 calculates the current second adjustment 212 based on:

$$\beta(n+1) \sim \beta(n) + \mu'_\beta (I_2(n)^2 - Q_2(n)^2). \quad \text{Equation (2).}$$

Continuing with the example, the current second adjustment 212 can be represented as '$\beta(n+1)$'. The current second adjustment 212 can be calculated as an estimation based on the preceding second adjustment 216, represented as '$\beta(n)$', a second update parameter 217, represented as '$\mu'_\beta$', the in-phase squared result 218, represented as '$I_2^2$ or $I_2(n)^2$', and the quadrature squared result 220, represented as '$Q_2^2$ or $Q_2(n)^2$'. The second update parameter 217 can function as a further adjustment parameter for the second adjustment for updating the second adjustment to converge to the maximum-likelihood value. The second update parameter 217 can be unique for the maximum likelihood mechanism, and can be different than any adjustment or update parameters utilized for the least-mean-squares mechanism.

The second update parameter 217 can include any value greater than 0. As a more specific example, the second update parameter 217 can be a value relatively close to 1.0.

The second update parameter 217 can be updated with every new sample of the in-phase signal-component and the quadrature signal-component. The second update parameter 217 can also be updated periodically every 'k' samples, with 'k' representing and integer greater than or equal to 1. The communication system 100 can further skip portions of the signals, such as for preambles or other designated portions. The second update parameter 217 can be used to balance a convergence rate characteristic and a steady state characteristic The convergence rate characteristic can include a behavior of the adjustment value or a portion thereof moving toward or approaching a state or a level. The steady state characteristic 232 is a state, or a level attained the end of convergence.

The second parameter block 242 can calculate the second adjustment, such as the current second adjustment 212, using one or more communication circuits, one or more control circuits, or a combination thereof corresponding to the receiving device. The second parameter block 242 can store the second adjustment, with the current second adjustment 212 becoming the preceding second adjustment 216 after completing the current iteration, in one or more storage circuits, one or more communication circuits, or a combination thereof corresponding to the receiving device.

The communication system 100 can apply the current second adjustment 212 to a result of adjusting the in-phase signal-component with the current first adjustment 210 in removing or eliminating the I/Q imbalance. As exemplified above, the communication system 100 calculates the product of the current first adjustment 210 and the initial in-phase signal component 202.

The communication system 100 can further add the resulting product to the initial quadrature signal component 204 to generate the partially-adjusted quadrature component 215. The communication system 100 can combine the current second adjustment 212 with the partially-adjusted quadrature component 215, such as by multiplying the values together.

The communication system 100 can apply the current second adjustment 212 in using the adjustment value to remove or minimize the I/Q imbalance. The adjustment process and the usage of the adjustment value exemplified in FIG. 2 can be represented as:

$$I_2(n)=I_1(n), \text{ and } Q_2(n)=\beta(\alpha I_1(n)+Q_1(n)). \quad \text{Equation (3).}$$

The communication system 100 can include feedback information as input to the second parameter block 242 for calculating or updating the second adjustment. The adjusted in-phase signal component 206 and the adjusted quadrature signal component 208 can be fed back to the second parameter block 242. The communication system 100 can feed back the adjusted quadrature signal component 208 generated or calculated after multiplying the partially-adjusted quadrature component 215 with the second adjustment to complete the adjustment for eliminating or minimizing the I/Q imbalance.

The communication system 100 can apply the adjustment value using the communication circuit, the control circuit, or a combination thereof corresponding to the receiver device. The communication system 100 can store the adjustment value, the adjusted signal components, or a combination thereof in the storage circuit.

For illustrative purposes, the communication system 100 is shown applying the first adjustment and the second adjustment to the quadrature signal-component path, the initial quadrature portion 204, or a combination thereof. The adjusted in-phase signal component 206 is shown and was discussed as being equal to the initial in-phase signal component 202, its original and unadjusted value, and with all adjustments applied to the initial quadrature signal component 204 to generate the adjusted quadrature signal component 208.

However, it is understood that the communication system 100 can apply the adjustment value to the in-phase signal-component path, the initial in-phase signal component 202, or a combination thereof. The communication system 100 can apply the adjustment value to either of or only one of the initial quadrature portion 204 or the initial in-phase signal component 202. The communication system 100 can further process or apply the adjustment value or a portion therein to both the initial quadrature portion 204 and the initial in-phase signal component 202 by suitable modification of mechanism which is obvious to one skilled in the art.

It has been discovered that the adjustment value calculated based on or according to the maximum-likelihood mechanism provides faster convergence while meeting the same steady state performance of the IQ imbalance correction. The use of the in-phase squared result 218 and the quadrature squared result 220 instead of the in-phase absolute-value result and the quadrature absolute-value result improves the convergence rate characteristic 230 without degrading the steady state characteristic 232. The in-phase squared result 218 and the quadrature squared result 220 can also be used to keep convergence rate the same while improving the steady state performance, or provide a combination of partial improvements to both the convergence rate characteristic 230 and the steady state characteristic 232.

The communication system 100 can use the adjusted in-phase signal component 206 and the adjusted quadrature signal component 208 for further processing regarding the communication content. For example, the communication system 100 decodes the received signal based on the adjusted signal components. The communication system 100 can further implement the communication content or execute a device or a component therein according to the communication content.

The communication system 100 can use the communication circuit, the control circuit, or a combination thereof to further process for the received signal. The communication system 100 can further communicate the communication content, a status or an implementation result thereof, or a combination thereof to the user using the communication circuit, the control circuit, the user interface, or a combination thereof.

The physical transformation of the received signal or the in-phase signal-component, the quadrature signal-component, or a combination thereof for the received signal using the adjustment value results in the movement in the physical world, such as the communication content communicated to the user or processed at the receiving device. The communication system 100 can further transform electro-magnetic signals corresponding to the transmitted signal and the received signal to computer readable non-transitory data, and further adjust the data in calculating the adjustment value and the adjusted signal components.

The communication content reproduced or processed on the first device 102, such as navigation information or voice signal of a caller, can influence the user's movement, such as following the navigation information or replying back to the caller. Movement in the physical world results in changes to the communication channel, the geographic location of the first device 102, or a combination thereof, which can be fed back into the communication system 100 and further influence subsequent communications or blocks of exchanged information.

Figure 3:
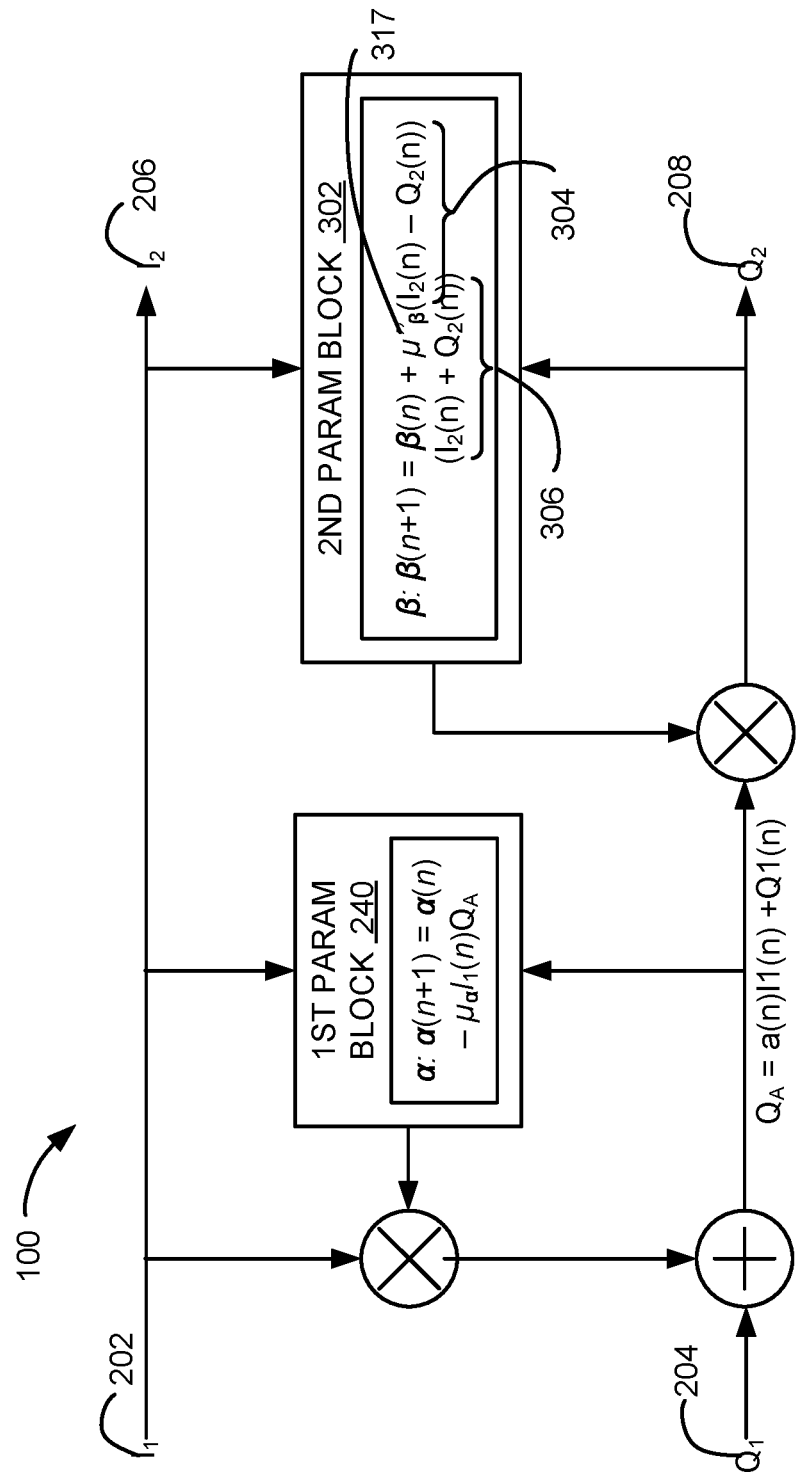
FIG. 3 is a further exemplary illustration of the communication system.

Referring now to FIG. 3, therein is shown a further exemplary illustration of the communication system 100. The communication system 100, as exemplified in FIG. 3, can process the received signal similarly as describe above for FIG. 2.

For example, the down-conversion mechanism processes the initial in-phase signal component 202 and the initial quadrature signal component 204. Also for example, the first parameter block 240 calculates the first adjustment as discussed above. Also for example, the communication system 100 combines or adjusts one or more of the signal components using the adjustment value as discussed above.

The communication system 100 can further include a second parameter block 302 configured to calculate the adjustment value including the second adjustment. The second parameter block 302 can be similar to the second parameter block 242 of FIG. 2. However, the second parameter block 302 can utilize a component difference result 304 and a component addition result 306 to calculate the second adjustment.

The component difference result 304 can include a difference between the in-phase signal-component and the quadrature signal-component. For example, the component difference result 304 includes a difference between the adjusted in-phase signal component 206 and the adjusted quadrature signal component 208.

The component addition result 306 can include a combination or an addition between the in-phase signal-component and the quadrature signal-component. For example, the component addition result 306 includes a result from adding the adjusted in-phase signal component 206 and the adjusted quadrature signal component 208.

The second parameter block 302 can calculate the component difference result 304 and the component addition result 306 instead of calculating the in-phase squared result 218 of FIG. 2 and the quadrature squared result 220 of FIG. 2. The second parameter block 302 can multiply the component difference result 304 and the component addition result 306. The result of multiplying the component difference result 304 and the component addition result 306 can be equivalent to the difference between the in-phase squared result 218 and the quadrature squared result 220.

The second parameter block 302 can calculate the current second adjustment 212 of FIG. 2 based on or utilizing the component difference result 304 and the component addition result 306 for the maximum-likelihood mechanism instead of the in-phase absolute-value result and the quadrature absolute-value result corresponding to the least-mean-squares mechanism. For example, the second parameter block 302 calculates the current second adjustment 212 according to:

$$\beta(n+1) \sim \beta(n) + \mu''_\beta (I_2((n)-Q_2(n))(I_2(n)+Q_2(n)). \quad \text{Equation (4)}.$$

The component addition result 306 can be represented as '$(I_2(n)+Q_2(n))$'. The component difference result 304 can be represented as '$(I_2(n)-Q_2(n))$'. The second parameter block 302 can effectively calculate the term '$(I_2(n)_2-Q_2(n)^2)$' for Equation (2) based on implementing '$(I_2(n)-Q_2(n))\cdot(I_2(n)+Q_2(n))$'.

The second parameter block 302 can further calculate the current second adjustment 212 using a second update parameter 317, represented as '$\mu''_\beta$'. The second update parameter 317 can be unique for the maximum likelihood mechanism, and can be different than any adjustment or update parameters utilized for the least-mean-squares mechanism.

The second update parameter 317 can function as a further adjustment parameter for the second adjustment for updating the second adjustment to converge to the maximum-likelihood value similar in characteristic as the second update parameter 217 of FIG. 2. However, the actual value of the second update parameter 317 can be different from the second update parameter 217.

It has been discovered that using the component difference result 304 and the component addition result 306 in calculating the adjustment value provides reduced complexity and reduction in amount of necessary resources. Calculating the adjustment value using Equation (4) can reduce a quantity of the multipliers 236 of FIG. 2.

The second parameter block 302 can calculate the second adjustment, such as the current second adjustment 212, using one or more communication circuits, one or more control circuits, or a combination thereof corresponding to the receiving device. The second parameter block 302 can store the second adjustment, with the current second adjustment 212 becoming the preceding second adjustment 216 after completing the current iteration, in one or more storage circuits, one or more communication circuits, or a combination thereof corresponding to the receiving device.

Figure 4:
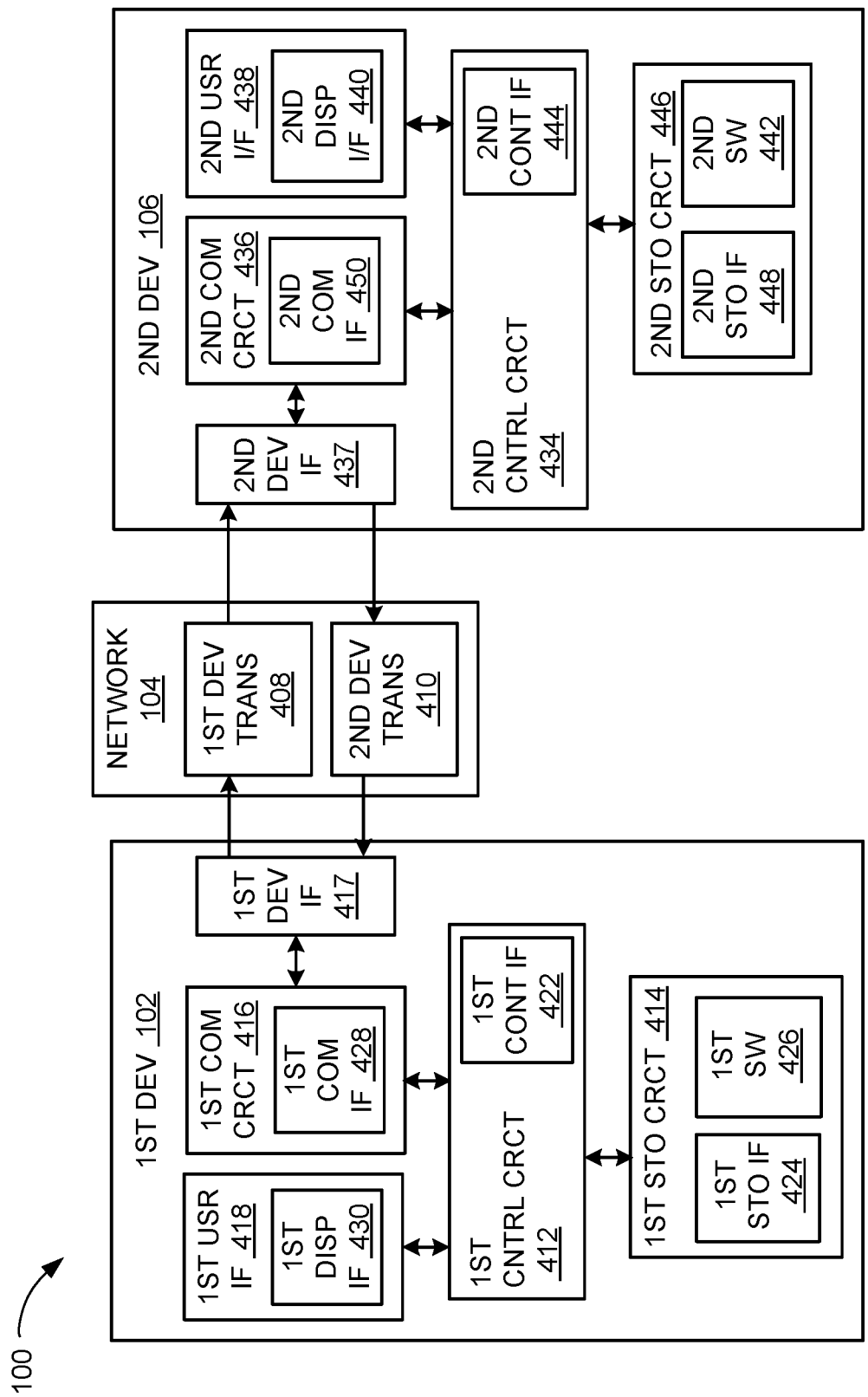
FIG. 4 is an exemplary block diagram of the communication system.

Referring now to FIG. 4, therein is shown an exemplary block diagram of the communication system 100. The communication system 100 can include the first device 102, the network 104, and the second device 106.

The first device 102 can send information in a first device transmission 408 over the network 104 to the second device 106. The second device 106 can send information in a second device transmission 410 over the network 104 to the first device 102.

For illustrative purposes, the communication system 100 is shown with the first device 102 as a client device, although it is understood that the communication system 100 can have the first device 102 as a different type of device. For example, the first device 102 is a server having a display interface.

Also for illustrative purposes, the communication system 100 is shown with the second device 106 as a base station, although it is understood that the communication system 100 can have the second device 106 as a different type of device. For example, the second device 106 includes any device for communication, including a client device.

The first device 102 can include a first control circuit 412, a first storage circuit 414, a first communication circuit 416, and a first user interface 418. The first control circuit 412 can include a first control interface 422. The first control circuit 412 can execute a first software 426 to provide the intelligence of the communication system 100.

The first control circuit 412 can be implemented in a number of different manners. For example, the first control circuit 412 is a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control circuit 412 and other functional units or circuits in the first device 102. The first control interface 422 can also be used for communication that is external to the first device 102.

The first control interface 422 can receive information from the other functional units/circuits or from external sources, or can transmit information to the other functional units/circuits, or to external destinations. The external sources and the external destinations refer to sources and destinations external to the first device 102.

The first control interface 422 can be implemented in different ways and can include different implementations depending on which functional units/circuits or external units/circuits are being interfaced with the first control interface 422. For example, the first control interface 422 is implemented with a pressure sensor, an inertial sensor, a microelectromechanical system (MEMS), optical circuitry, waveguides, wireless circuitry, wireline circuitry, or a combination thereof.

The first storage circuit 414 can store the first software 426. The first storage circuit 414 can also store the relevant information, such as data representing incoming images, data representing previously presented image, sound files, or a combination thereof.

The first storage circuit 414 can be a volatile memory, a nonvolatile memory, an internal memory, an external memory, or a combination thereof. For example, the first storage circuit 414 is a nonvolatile storage such as nonvolatile random access memory (NVRAM), Flash memory, disk storage, or a volatile storage such as static random access memory (SRAM).

The first storage circuit 414 can include a first storage interface 424. The first storage interface 424 can be used for communication between the first storage circuit 414 and other functional units or circuits in the first device 102. The first storage interface 424 can also be used for communication that is external to the first device 102.

The first storage interface 424 can receive information from the other functional units/circuits or from external sources, or can transmit information to the other functional units/circuits or to external destinations. The external sources and the external destinations refer to sources and destinations external to the first device 102.

The first storage interface 424 can include different implementations depending on which functional units/circuits or external units/circuits are being interfaced with the first storage circuit 414. The first storage interface 424 can be implemented with technologies and techniques similar to the implementation of the first control interface 422.

The first communication circuit 416 can enable external communication to and from the first device 102. For example, the first communication circuit 416 permits the first device 102 to communicate with the second device 106, a different device, an attachment, such as a peripheral device or a desktop computer, the network 104, or a combination thereof.

The first communication circuit 416 can also function as a communication hub allowing the first device 102 to function as part of the network 104 and not limited to be an end point or terminal unit to the network 104. The first communication circuit 416 can include active and passive components, such as microelectronics or an antenna, for interaction with the network 104.

The first communication circuit 416 can include a baseband device or component, a modem, a digital signal processor, or a combination thereof for transmitting, formatting, receiving, detecting, decoding, further processing, or a combination thereof for communication signals. The first communication circuit 416 can include one or more portions for processing the voltages, the currents, the digital information, or a combination thereof, such as an analog-to-digital converter, a digital-to-analog converter, a filter, an amplifier, a processor-type circuitry, or a combination thereof. The first communication circuit 416 can further include one or more portions for storing information, such as cache or RAM memory, registers, or a combination thereof.

The first communication circuit 416 can be coupled with a first inter-device interface 417. The first inter-device interface 417 can be a device or a portion of a device for physically communicating signals with a separate device. The first inter-device interface 417 can communicate by transmitting or receiving signals to or from another device. The first inter-device interface 417 can include one or more antennas for wireless signals, a physical connection and receiver-transmitter for wired signals, or a combination thereof. The first inter-device interface 417 can include an omnidirectional antenna, a wire, an antenna chip, a ceramic antenna, or a combination thereof. The first inter-device interface 417 can further include a port, a wire, a repeater, a connector, a filter, a sensor, or a combination thereof.

The first inter-device interface 417 can detect or respond to a power in electromagnetic waves and provide the detected result to the first communication circuit 416 to receive a signal, including the second device transmission 410. The first inter-device interface 417 can provide a path or respond to currents or voltages provided by the first communication circuit 416 to transmit a signal, including the first device transmission 408.

The first communication circuit 416 can include a first communication interface 428. The first communication interface 428 can be used for communication between the first communication circuit 416 and other functional units or circuits in the first device 102. The first communication interface 428 can receive information from the other functional units/circuits or can transmit information to the other functional units or circuits.

The first communication interface 428 can include different implementations depending on which functional units or circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 includes a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control circuit 412 can operate the first user interface 418 to display information generated by the communication system 100. The first control circuit 412 can also execute the first software 426 for the other functions of the communication system 100. The first control circuit 412 can further execute the first software 426 for interaction with the network 104 via the first communication circuit 416.

The second device 106 can be optimized for implementing an embodiment of the present invention in a multiple device embodiment with the first device 102. The second device 106 can provide the additional or higher performance processing power compared to the first device 102. The second device 106 can include a second control circuit 434, a second communication circuit 436, a second user interface 438, and a second storage circuit 446.

The second user interface 438 allows a user (not shown) to interface and interact with the second device 106. The second user interface 438 can include an input device and an output device. Examples of the input device of the second user interface 438 includes a keypad, a touchpad, soft-keys, a keyboard, a microphone, or any combination thereof to provide data and communication inputs. Examples of the output device of the second user interface 438 include a second display interface 440. The second display interface 440 can include a display, a projector, a video screen, a speaker, or any combination thereof.

The second control circuit 434 can execute a second software 442 to provide the intelligence of the second device 106 of the communication system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the communication system 100, including operating the second communication circuit 436 to communicate with the first device 102 over the network 104.

The second control circuit 434 can be implemented in a number of different manners. For example, the second control circuit 434 is a processor, an embedded processor, a microprocessor, hardware control logic, a hardware finite state machine (FSM), a digital signal processor (DSP), or a combination thereof.

The second control circuit 434 can include a second control interface 444. The second control interface 444 can be used for communication between the second control circuit 434 and other functional units or circuits in the second device 106. The second control interface 444 can also be used for communication that is external to the second device 106.

The second control interface 444 can receive information from the other functional units/circuits or from external sources, or can transmit information to the other functional units/circuits or to external destinations. The external sources and the external destinations refer to sources and destinations external to the second device 106.

The second control interface 444 can be implemented in different ways and can include different implementations depending on which functional units/circuits or external units/circuits are being interfaced with the second control interface 444. For example, the second control interface 444 is implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the information such as data representing incoming images, data representing previously presented image, sound files, or a combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the communication system 100 is shown with the second storage circuit 446 as a single hierarchy storage system, although it is understood that the communication system 100 can have the second storage circuit 446 in a different configuration. For example, the second storage circuit 446 is formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 is a nonvolatile storage such as nonvolatile random access memory (NVRAM), Flash memory, disk storage, or a volatile storage such as static random access memory (SRAM).

The second storage circuit 446 can include a second storage interface 448. The second storage interface 448 can be used for communication between the second storage circuit 446 and other functional units or circuits in the second device 106. The second storage interface 448 can also be used for communication that is external to the second device 106.

The second storage interface 448 can receive information from the other functional units/circuits or from external sources, or can transmit information to the other functional units/circuits or to external destinations. The external sources and the external destinations refer to sources and destinations external to the second device 106.

The second storage interface 448 can include different implementations depending on which functional units/circuits or external units/circuits are being interfaced with the second storage circuit 446. The second storage interface 448 can be implemented with technologies and techniques similar to the implementation of the second control interface 444.

The second communication circuit 436 can enable external communication to and from the second device 106. For example, the second communication circuit 436 permits the second device 106 to communicate with the first device 102 over the network 104.

The second communication circuit 436 can also function as a communication hub allowing the second device 106 to function as part of the network 104 and not limited to be an end point or terminal unit to the network 104. The second communication circuit 436 can include active and passive components, such as microelectronics or resistors, for interaction with the network 104.

The second communication circuit 436 can include a baseband device or component, a modem, a digital signal processor, or a combination thereof for transmitting, formatting, receiving, detecting, decoding, further processing, or a combination thereof for communication signals. The second communication circuit 436 can include one or more portions for processing the voltages, the currents, the digital information, or a combination thereof, such as an analog-to-digital converter, a digital-to-analog converter, a filter, an amplifier, a processor-type circuitry, or a combination thereof. The second communication circuit 436 can further include one or more portions for storing information, such as cache or RAM memory, registers, or a combination thereof.

The second communication circuit 436 can be coupled with a second inter-device interface 437. The second inter-device interface 437 can be a device or a portion of a device for physically communicating signals with a separate device. The second inter-device interface 437 can communicate by transmitting or receiving signals to or from another device. The second inter-device interface 437 can include one or more antennas for wireless signals, a physical connection and receiver-transmitter for wired signals, or a combination thereof. The second inter-device interface 437 can include an omnidirectional antenna, a wire, an antenna chip, a ceramic antenna, or a combination thereof. The second inter-device interface 437 can further include a port, a wire, a repeater, a connector, a filter, a sensor, or a combination thereof.

The second inter-device interface 437 can detect or respond to a power in electromagnetic waves and provide the detected result to the second communication circuit 436 to receive a signal, including the first device transmission 408. The second inter-device interface 437 can provide a path or respond to currents or voltages provided by the second communication circuit 436 to transmit a signal, including the second device transmission 410.

The second communication circuit 436 can include a second communication interface 450. The second communication interface 450 can be used for communication between the second communication circuit 436 and other functional units/circuits in the second device 106. The second communication interface 450 can receive information from the other functional units/circuits or can transmit information to the other functional units/circuits.

The second communication interface 450 can include different implementations depending on which functional units/circuits are being interfaced with the second communication circuit 436. The second communication interface 450 can be implemented with technologies and techniques similar to the implementation of the second control interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The communication system 100 can be executed by the first control circuit 412, the second control circuit 434, or a combination thereof. For illustrative purposes, the second device 106 is shown with the partition having the second user interface 438, the second storage circuit 446, the second control circuit 434, and the second communication circuit 436, although it is understood that the second device 106 can have a different partition. For example, the second software 442 is partitioned differently such that some or all of its function can be in the second control circuit 434 and the second communication circuit 436. Also, the second device 106 can include other functional units or circuits not shown in FIG. 4 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits is implemented using the a gate, circuitry, a processor, a computer, integrated circuit, integrated circuit cores, a microelectromechanical system (MEMS), a passive device, a physical non-transitory memory medium having instructions for performing the software function, a portion therein, or a combination thereof.

For illustrative purposes, the communication system 100 is described by operation of the first device 102 and the second device 106. It is understood that the first device 102 and the second device 106 can operate any of the blocks and functions of the communication system 100.

The down-conversion mechanism and the blocks and components discussed in FIG. 2 and FIG. 3 can be implemented using the inter-device interface, the communication circuit, the control circuit, the storage circuit, or a combination thereof for the first device 102 or the second device 106 receiving and processing the received signal. The down-conversion mechanism and the blocks and components discussed in FIG. 2 and FIG. 3 can be included or implemented within the inter-device interface, the communication circuit, the control circuit, the storage circuit, an implementation thereof in or using one or more semiconductor chips, or a combination thereof for the first device 102 or the second device 106.

Figure 5:
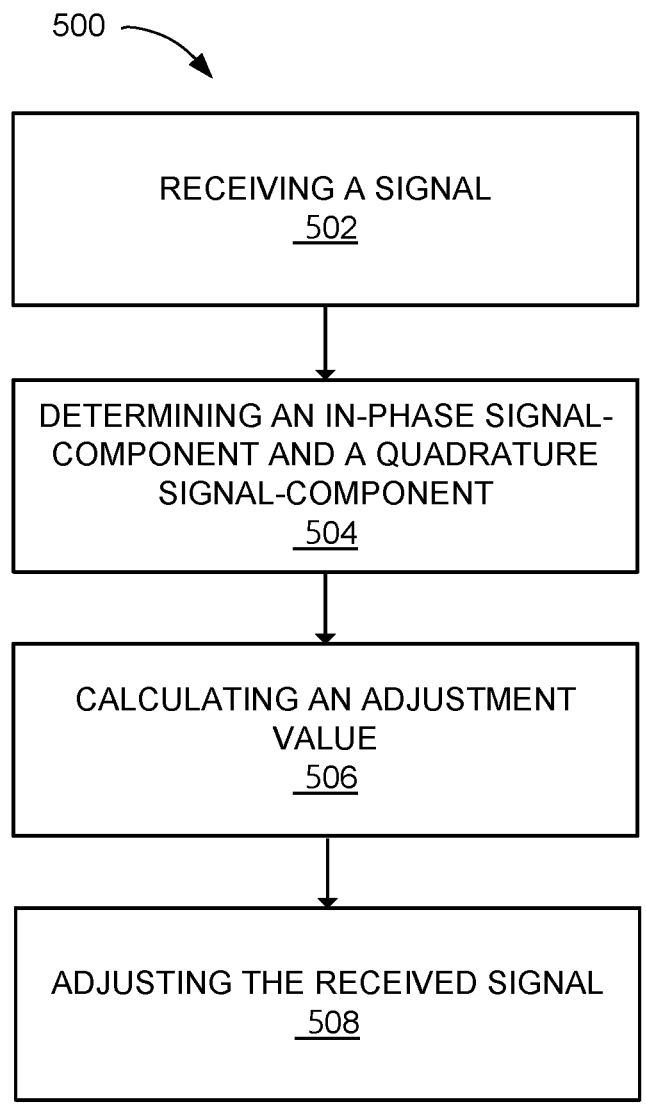
FIG. 5 is a flow chart of a method of operation of a communication system in a further embodiment.

Referring now to FIG. 5, therein is shown a flow chart 500 of a method of operation of a communication system in a further embodiment. The method 500 includes: receiving signal including communication content a block 502; determining an in-phase signal-component and a quadrature signal-component based on the received signal in a block 504; calculating an adjustment value including a first adjustment and a second adjustment based on the in-phase signal-component and the quadrature signal-component according to a maximum-likelihood mechanism in a block 506; and adjusting the received signal based on the adjustment value for reducing an in-phase/quadrature imbalance between the in-phase signal-component and the quadrature signal-component in processing the communication content in a block 508.

The blocks described in this application can be hardware implementation or hardware accelerators, including passive circuitry, active circuitry, or both, in the first communication circuit 416 of FIG. 4, the second communication circuit 436 of FIG. 4, the first control circuit 412 of FIG. 4, the second control circuit 438 of FIG. 4, or a combination thereof. The blocks can also be hardware implementation or hardware accelerators, including passive circuitry, active circuitry, or both, within the first device 102 of FIG. 1, the second device 106 of FIG. 1, or a combination thereof but outside of the first communication circuit 416, the second communication circuit 436, the first control circuit 412, the second control circuit 434, or a combination thereof.

The communication system 100 has been described with block functions or order as an example. The communication system 100 can partition the blocks differently or order the blocks differently. For example, the first parameter block 240 of FIG. 2 and the second parameter block 242 of FIG. 2 or 302 of FIG. 3 can be combined into one block.

For illustrative purposes, the various blocks have been described as being specific to the first device 102, the second device 106, or a combination thereof. However, it is understood that the blocks can be distributed differently. For example, the various blocks can be implemented in a different device, or the functionalities of the blocks can be distributed across multiple circuits. Also as an example, the various blocks can be stored in a non-transitory memory medium.

As a more specific example, one or more blocks described above can be stored in the non-transitory memory medium for distribution to a different system, a different device, a different user, or a combination thereof, for manufacturing, or a combination thereof. Also as a more specific example, the blocks described above can be implemented or stored using a single hardware unit, such as a chip or a processor, or across multiple hardware units.

The blocks described in this application can be stored in the non-transitory computer readable medium. The first communication circuit 416 of FIG. 4, the second communication circuit 436 of FIG. 4, the first storage circuit 414 of FIG. 4, the second storage circuit 446 of FIG. 4, or a combination thereof can represent the non-transitory computer readable medium. The first communication circuit 416, the second communication circuit 436, the first storage circuit 414, the second storage circuit 446, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment described herein is that it valuably supports and services the historical trend of reducing costs, simplifying systems, and increasing performance.

These and other valuable aspects of an embodiment consequently further the state of the technology to at least the next level.

While the embodiments have been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A communication system comprising:
an inter-device interface configured to receive a received signal including communication content;
a communication circuit, coupled to the inter-device interface, configured to:
  determine an in-phase signal-component and a quadrature signal-component based on the received signal;
  calculate an adjustment value including a first adjustment and a second adjustment based on the in-phase signal-component and the quadrature signal-component,
  wherein:
    the second adjustment is calculated based on adjusting a preceding second adjustment corresponding to the second adjustment of a preceding iteration;
    the first adjustment including a current first adjustment and the second adjustment including a current second adjustment is calculated based on a preceding first adjustment, the preceding second adjustment, or a combination thereof along with the in-phase signal-component and the quadrature signal-component;
  adjust the received signal based on the adjustment value for reducing an in-phase/quadrature imbalance between the in-phase signal-component and the quadrature signal-component in processing the communication content;
  generate an adjusted in-phase signal component and an adjusted quadrature signal component for the preceding iteration based on applying the preceding first adjustment and the preceding second adjustment to the received signal or a component therein;
wherein calculate the adjustment value further includes:
calculate the adjustment value including the preceding first adjustment and the preceding second adjustment corresponding to the preceding iteration;
calculate the adjustment value including the current first adjustment and the current second adjustment for a current iteration based on;
calculating a difference between an in-phase squared result and a quadrature squared result based on the adjusted in-phase signal component and the adjusted quadrature signal component corresponding to the preceding iteration; and
calculating the current second adjustment based on the difference between the in-phase squared result and the quadrature squared result, the current second adjustment for adjusting an initial in-phase signal component, an initial quadrature signal component, or a combination thereof in the received signal for the current iteration.

2. The system as claimed in claim 1 wherein the communication circuit is configured to calculate the second adjustment based on calculating a squared result of the in-phase signal-component and a further squared result of the quadrature signal-component.

3. The system as claimed in claim 1 wherein the communication circuit is configured to calculate the second adjustment based on an update parameter.

4. The system as claimed in claim 1 wherein the communication circuit is configured to:
calculate a component difference result based on the in-phase signal-component and the quadrature signal-component;
calculate a component addition result based on the in-phase signal-component and the quadrature signal-component; and
calculate the second adjustment based the component difference result and the component addition result.

5. The system as claimed in claim 1 wherein the communication circuit is configured to adjust the received signal by adjusting the in-phase signal-component or the quadrature signal-component using the adjustment value.

6. The system as claimed in claim 1 wherein the communication circuit is configured to calculate the current second adjustment based on an in-phase squared result and a quadrature squared result instead of utilizing an in-phase absolute-value result and a quadrature absolute-value result.

7. The system as claimed in claim 1 wherein the communication circuit is configured to calculate the adjustment value based on an update parameter for balancing a steady state characteristic with a convergence rate characteristic in reducing the in-phase/quadrature imbalance.

8. The system as claimed in claim 1 wherein the communication circuit is configured to calculate the adjustment value according to the maximum-likelihood mechanism instead of, in addition to, or a combination thereof relative to a least-mean-squares mechanism or a portion therein.

9. A method of operation of a communication system comprising:
receiving a received signal including communication content;
determining an in-phase signal-component and a quadrature signal-component based on the received signal;
calculating with a communication circuit an adjustment value including a first adjustment and a second adjustment based on the in-phase signal-component and the quadrature signal-component,
wherein:
the second adjustment is calculated based on adjusting a preceding second adjustment corresponding to the second adjustment of a preceding iteration;
the first adjustment including a current first adjustment and the second adjustment including a current second adjustment is calculated based on a preceding first adjustment, the preceding second adjustment, or a combination thereof along with the in-phase signal-component and the quadrature signal-component;
adjusting the received signal based on the adjustment value for reducing an in-phase/quadrature imbalance between the in-phase signal-component and the quadrature signal-component in processing the communication content;
generating an adjusted in-phase signal component and an adjusted quadrature preceding first adjustment and the preceding second adjustment to the received signal or a component therein;
wherein calculating the adjustment value further includes:
calculating the adjustment value including the preceding first adjustment and the preceding second adjustment corresponding to the preceding iteration;
calculating the adjustment value including the current first adjustment and the current second adjustment for a current iteration based on:
calculating a difference between an in-phase squared result and a quadrature squared result based on the adjusted in-phase signal component and the adjusted quadrature signal component corresponding to the preceding iteration; and
calculating the current second adjustment based on the difference between the in-phase squared result and the quadrature squared result, the current second adjustment for adjusting an initial in-phase signal component, an initial quadrature signal component, or a combination thereof in the received signal for the current iteration.

10. The method as claimed in claim 9 wherein calculating the adjustment value includes calculating the second adjustment based on calculating a squared result of the in-phase signal-component and a further squared result of the quadrature signal-component.

11. The method as claimed in claim 9 wherein calculating the adjustment value includes calculating the second adjustment based on an update parameter.

12. The method as claimed in claim 9 wherein calculating the adjustment value includes:
calculating a component difference result based on the in-phase signal-component and the quadrature signal-component;
calculating a component addition result based on the in-phase signal-component and the quadrature signal-component; and
calculating the adjustment value based the component difference result and the component addition result.

13. The method as claimed in claim 9 wherein adjusting the received signal includes adjusting the received signal by adjusting the in-phase signal-component or the quadrature signal-component using the adjustment value.

14. A non-transitory computer readable medium including instructions for a communication system comprising:
- receiving a received signal including communication content;
- determining an in-phase signal-component and a quadrature signal-component based on the received signal;
- calculating an adjustment value including a first adjustment and a second adjustment based on the in-phase signal-component and the quadrature signal-component,
  - wherein:
    - the second adjustment is calculated based on adjusting a preceding second adjustment corresponding to the second adjustment of a preceding iteration;
    - the first adjustment including a current first adjustment and the second adjustment including a current second adjustment is calculated based on a preceding first adjustment, the preceding second adjustment, or a combination thereof along with the in-phase signal-component and the quadrature signal-component;
- adjusting the received signal based on the adjustment value for reducing an in-phase/quadrature imbalance between the in-phase signal-component and the quadrature signal-component in processing the communication content;
- generating an adjusted in-phase signal component and an adjusted quadrature signal component for the preceding iteration based on applying the preceding first adjustment and the preceding second adjustment to the received signal or a component therein;
- wherein calculating the adjustment value further includes:
  - calculating the adjustment value including the preceding first adjustment and the preceding second adjustment corresponding to the preceding iteration;
  - calculating the adjustment value including the current first adjustment and the current second adjustment for a current iteration based on:
    - calculating a difference between an in-phase squared result and a quadrature squared result based on the adjusted in-phase signal component and the adjusted quadrature signal component corresponding to the preceding iteration; and
    - calculating the current second adjustment based on the difference between the in-phase squared result and the quadrature squared result, the current second adjustment for adjusting an initial in-phase signal component, an initial quadrature signal component, or a combination thereof in the received signal for the current iteration.

15. The non-transitory computer readable medium as claimed in claim 14 wherein calculating the adjustment value includes calculating the second adjustment based on calculating a squared result of the in-phase signal-component and a further squared result of the quadrature signal-component.

16. The non-transitory computer readable medium as claimed in claim 14 wherein calculating the adjustment value includes calculating the second adjustment based on an update parameter.

17. The non-transitory computer readable medium as claimed in claim 14 wherein calculating the adjustment value includes:
- calculating a component difference result based on the in-phase signal-component and the quadrature signal-component;
- calculating a component addition result based on the in-phase signal-component and the quadrature signal-component; and
- calculating the adjustment value based the component difference result and the component addition result.

18. The non-transitory computer readable medium as claimed in claim 14 wherein adjusting the received signal includes adjusting the received signal by adjusting the in-phase signal-component or the quadrature signal-component using the adjustment value.

\* \* \* \* \*